Dec. 22, 1925.  W. J. GROTENHUIS  1,566,533
AUTOMOBILE BUMPER
Filed June 11, 1925

Witness:
Chas. R. Hursh

Inventor,
William J. Grotenhuis.

Patented Dec. 22, 1925.

1,566,533

UNITED STATES PATENT OFFICE.

WILLIAM J. GROTENHUIS, OF CHICAGO, ILLINOIS, ASSIGNOR TO BIFLEX PRODUCTS COMPANY, OF WAUKEGAN, ILLINOIS, A CORPORATION OF DELAWARE.

AUTOMOBILE BUMPER.

Application filed June 11, 1925. Serial No. 36,327.

*To all whom it may concern:*

Be it known that I, WILLIAM J. GROTENHUIS, a citizen of the United States of America, and a resident of Chicago, in the county of Cook and State of Illinois, have invented a certain new and useful Improvement in Automobile Bumpers, of which the following is a specification.

This invention relates to improvements in automobile bumpers, and more particularly to bumpers of the resilient bar type, consisting of an impact member extending across the front of the bumper and having its end portions bent in the form of U-shaped loops and carried inwardly therefrom to form rearwardly disposed arms to which the bumper attaching members are secured.

The object of the present invention is to provide a bumper which is especially suitable for mounting on the rear of a vehicle, without interfering with the spare tire or wheel and without a sacrifice in strength and protective qualities of the bumper, in providing ample space for the spare tire and for access thereto.

Other novel features of construction will be brought out in the following discussion of the bumper illustrated in the accompanying drawings, in which—

Figure 3:
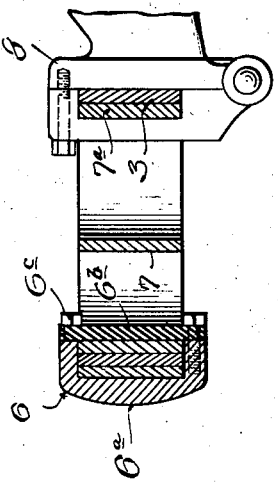
Figure 3 is an enlarged detail view in section taken on line 3—3 of Figure 2.
Figure 1:
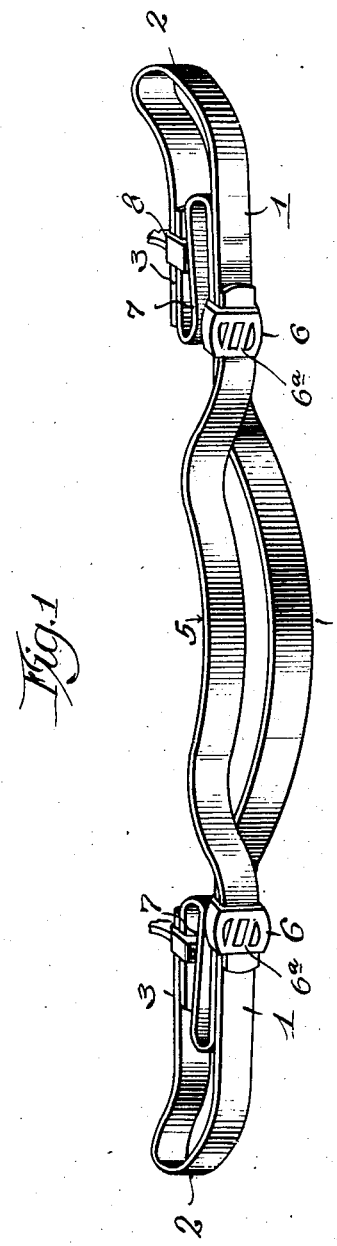
Figure 1 is a perspective view of the bumper.
Figure 2:
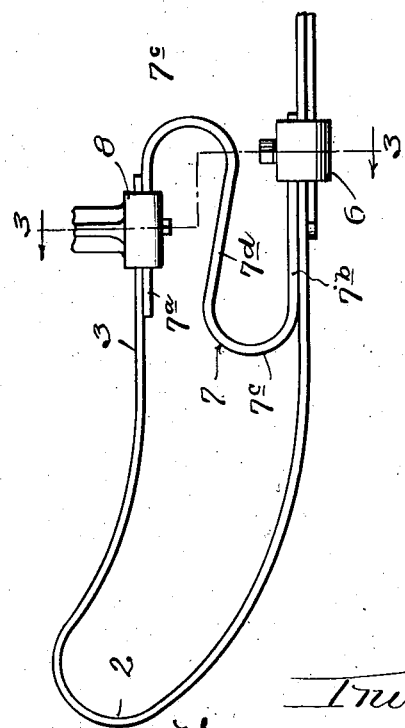
Figure 2 is an enlarged top plan view of one end portion of the bumper.

The bumper is constructed of flat bar stock of spring steel, the primary member being a single bar 1 extending throughout the forward or impact section of the bumper, with its end portions bent rearwardly and inwardly to form U-shaped or looped ends 2, 2, and rearwardly disposed arms 3, 3 terminating inwardly a short distance from the extremities of the bumper, and parallel with the forward portion of the bar. As a preferred construction for bumpers of this type the central portion of the impact or forward section of the bumper is widened by offsetting the bar 1 in a downwardly direction, as at 4, and clamping an auxiliary bar 5 to the bar 1 at either end of its offset portion, said auxiliary bar having a corresponding offset in a vertical direction. A pair of clamps 6, 6 secure the ends of the auxiliary bar 5 to the main bar, the same being preferably malleable castings consisting of a C-shaped member 6ª with a plate 6ᵇ which is fastened to the open side at the rear of the member 6ª by bolts 6ᶜ.

Between the front section of the bumper and the rear arms 3, 3 are interposed two springs 7, 7 made of pieces of the same flat bar stock bent into the shape of a flat S, that is, two connected reversed loops. These S-springs are located in line with the vehicle frame ends to which the bumper is attached by means of clamps 8, 8 which engage each of the arms 3, 3 near their ends and the rear end portion 7ª of each of the springs 7, the latter in each case extending in flatwise contact along the end portions of the arms with their extremities toward the outer ends of the bumper. The forward end portions 7ᵇ of the springs 7, 7 lie flatwise against the rear face of the front section of the bar 1, coming into contact therewith at a point substantially midway between the extremities of the bumper and the clamps 6, 6 and extending along the bar toward said clamps with their extreme ends passing through and held thereby. The portions of the S-springs between their ends 7ª, 7ᵇ make two reverse bends or loops 7ᶜ, with a straight portion 7ᵈ between the loops and extending substantially parallel between the front bar 1 and the arms 3, 3.

The manifest purpose of the S-springs is to give added strength to the bumper directly in line with points of attachment so that impacts received by the bumper are partially absorbed by the flexing of the S-spring as the front bar is distorted under the force of the impact. The advantage of these springs will be apparent when it is understood that the front impact section would ordinarily be reinforced by extending the rear attaching arms entirely across the space between the points of attachment and securing their ends together, but in order to accommodate the spare tire, these arms terminate at the attaching clamp 5, thus necessitating the adoption of other reinforcing means which does not interfere with the maintenance of an open space between the points of attachment.

The arrangement of the S-springs herein disclosed is particularly desirable because they are of ample length to absorb the impact, and further, being separable from the bumper itself may be shifted endwise by loosening the clamps which secure them at each end so that they can be adjusted so as to fit the bumper on any particular vehicle. In this connection it may be observed that different makes and styles of vehicles differ in the distance between the ends of the frames, and hence the attaching brackets must necessarily be adjusted along the rear arms 3, 3. Thus the springs being adjustable, it is possible to position them so as to be most effective in resisting impact.

Having set forth the purposes and advantages of the bumper structure disclosed, I claim as my invention:

1. A bumper comprising a resilient bar bent to form an impact section having looped ends and rearwardly disposed arms terminating inwardly from the ends of the bumper, and resilient reinforcing members extending transversely between, and connected at their ends to said arms and said impact section inwardly from the ends of the bumper and adapted for adjustment longitudinally therebetween.

2. A bumper comprising a resilient bar bent to form an impact section having looped ends and rearwardly disposed arms terminating inwardly from the ends of the bumper, of resilient bars bent in S-shape interposed between said rear arms and said impact section and extending laterally in both directions from the points of attachment of said arms with the automobile.

3. A bumper comprising a resilient bar bent to form an impact section having looped ends and rearwardly disposed arms terminating inwardly from the ends of the bumper, of an S-shaped spring member interposed between each of said arms and said impact member and clamped thereto for adjustment lengthwise of said bumper.

4. A bumper comprising a resilient bar bent to form an impact section having looped ends and rearwardly disposed arms terminating inwardly from the ends of the bumper, of S-shaped springs interposed between said arms and said impact member and clamped in flatwise contact at their ends to said arms and said impact section inwardly from the ends of the bumper.

5. A bumper comprising a resilient bar bent to form an impact section having looped ends and rearwardly disposed arms terminating inwardly from the ends of the bumper, bumper attaching members comprising clamps engaging said arms, S-shaped springs interposed between said arms and said impact section and secured at their rear ends to said arms by means of said clamps, and clamps for securing the forward ends of said springs in flatwise contact with said impact section.

6. A bumper comprising a resilient bar bent to form an impact section having looped ends and rearwardly disposed arms terminating inwardly from the ends of the bumper, S-shaped bars between said impact sections and said arms, and having straight end portions in flatwise contact with said means and said impact sections inwardly from the ends of the bumper, and clamps adjustably securing the end portions of said S-shaped bars to said arms and impact sections.

Signed at Chicago, this 6th day of May, 1925.

WILLIAM J. GROTENHUIS.